US00RE46655E

(19) United States
(12) Reissued Patent
Luong et al.

(10) Patent Number: US RE46,655 E
(45) Date of Reissued Patent: Jan. 2, 2018

(54) WATER JET MECHANISM FOR WHIRLPOOL EFFECT IN PEDICURES OR OTHER APPLICATIONS

(71) Applicant: LEXOR, INC., Westminster, CA (US)

(72) Inventors: Christopher L. Luong, Baltimore, MD (US); Quang Nguyen, Irvine, CA (US); Long Luong, Irvine, CA (US)

(73) Assignee: LEXOR, INC., Westminster, CA (US)

(21) Appl. No.: 14/814,205

(22) Filed: Jul. 30, 2015

Related U.S. Patent Documents

Reissue of:
(64) Patent No.: 8,272,079
Issued: Sep. 25, 2012
Appl. No.: 11/544,363
Filed: Oct. 6, 2006

U.S. Applications:
(63) Continuation of application No. 13/946,899, filed on Jul. 19, 2013, now abandoned, which is a continuation of application No. 13/910,977, filed on Jun. 5, 2013, which is an application for the reissue of Pat. No. 8,272,079, which is a continuation-in-part of application No. 11/312,907, filed on Dec. 20, 2005, now abandoned.

(51) Int. Cl.

| | |
|---|---|
| ***A61H 33/04*** | (2006.01) |
| ***A61H 35/00*** | (2006.01) |
| ***A47K 3/022*** | (2006.01) |
| ***A47K 3/00*** | (2006.01) |
| ***A61H 33/00*** | (2006.01) |

(52) U.S. Cl.
CPC ..... *A61H 33/6063* (2013.01); *A61H 33/0087* (2013.01); *A61H 33/6042* (2013.01); *A61H 33/6047* (2013.01); *A61H 35/006* (2013.01)

(58) Field of Classification Search
CPC ..... A61H 35/006; A61H 2203/0431
USPC ..... 4/541.1, 541.6, 622
See application file for complete search history.

(56) References Cited

U.S. PATENT DOCUMENTS

| | | | | |
|---|---|---|---|---|
| 3,591,872 | A | 7/1971 | Vanegas et al. | |
| 4,258,734 | A | 3/1981 | Hehlo | |
| 4,330,412 | A | 5/1982 | Frederick | |
| 4,726,917 | A | 2/1988 | Abe | |
| 4,805,664 | A * | 2/1989 | Mattei et al. | 137/543.23 |
| 4,853,987 | A | 8/1989 | Jaworski | |
| 5,386,598 | A * | 2/1995 | Mersmann | 4/541.4 |
| 5,414,878 | A | 5/1995 | Booth | |
| 5,862,543 | A | 1/1999 | Reynoso et al. | |
| 5,941,275 | A | 8/1999 | Laing | |

(Continued)

OTHER PUBLICATIONS

Petra Collection Owner's Manual (contains instructions for Sanijet Pipeless System users), pedicure spas by J&A, pp. 11 and 12, last updated Oct. 19, 2004, and copyright 2005, http://www.manualsbase.com/manual/662907/pedicure_spa/whirlpool/petra_collection/.

(Continued)

*Primary Examiner* — William Doerrler
(74) *Attorney, Agent, or Firm* — Klein, O'Neill & Singh, LLP

(57) ABSTRACT

A whirlpool foot bath for a pedicure chair having a housing with a removable cap and a rotor and stator magnetic motor within the housing. Water in the bath is circulated through an inlet in the cap and out through at least one outlet in the cap. A method of use is described.

71 Claims, 23 Drawing Sheets

(56) References Cited

U.S. PATENT DOCUMENTS

| | | | | |
|---|---|---|---|---|
| D454,705 | S | 3/2002 | Long et al. | |
| 6,732,387 | B1 | 5/2004 | Waldron | |
| 6,836,908 | B1 * | 1/2005 | Chang | A61H 33/6063 4/541.1 |
| 6,860,437 | B1 * | 3/2005 | Amendt et al. | 239/383 |
| 6,880,182 | B2 | 4/2005 | Gruenwald | |
| 6,944,893 | B1 * | 9/2005 | Mattson et al. | 4/541.1 |
| 7,108,202 | B1 * | 9/2006 | Chang | 239/380 |
| 7,111,334 | B2 | 9/2006 | Chen | |
| 7,168,107 | B2 | 1/2007 | Gruenwald | |
| 7,380,294 | B2 | 6/2008 | Lev et al. | |
| 7,424,753 | B2 | 9/2008 | Gruenwald | |
| 7,574,756 | B2 | 8/2009 | Tran | |
| 7,937,783 | B2 | 5/2011 | Qian et al. | |
| 8,272,079 | B2 | 9/2012 | Long | |
| 2005/0120473 | A1 | 6/2005 | Southon et al. | |
| 2005/0177935 | A1 | 8/2005 | Le | |
| 2005/0262627 | A1 * | 12/2005 | Jyue Chen | A61H 33/027 4/541.6 |
| 2006/0036198 | A1 | 2/2006 | Cafaro et al. | |
| 2006/0242760 | A1 | 11/2006 | Chao | |
| 2007/0214563 | A1 | 9/2007 | Le | |
| 2007/0226896 | A1 | 10/2007 | Fugate et al. | |
| 2008/0086810 | A1 | 4/2008 | Le | |

OTHER PUBLICATIONS

SpaEquip User Mannual (contains the Sanijet Pipeless Hydrotherapy, Pipeless Whirlpool Foot Bath Owner's Manual for Model: FB2-S115), pp. 2-11, revised Sep. 2004, https://system.netsuite.com/core/media/media.nl?id=46546&c=581183& =bc2e04615b690061a5e2&_xt=.pdf.

The Hanning document titled "Drain Pumps Synchronous Drain Pumps DPS/DPO," p. 6, http://www.hanning-hew.de/wChinesisch/download/Prospekte/SP/040213DrainPumps_E.pdf.

Amended Request for Ex Parte Reexamination of RE45,844E (Re-exam No. 90/013,804) dated Sep. 3, 2016; 173 pages.

Order Denying Request for Ex Parte Reexamination of RE45,844E (Re-exam No. 90/013,804) dated Nov. 30, 2016; 21 pages.

Petition to Vacate the Order Denying Request for Ex Parte Reexamination of RE45,844E (Re-exam No. 90/013,804) dated Dec. 30, 2016; 48 pages.

Decision on Petition Under 37 CFR 1.181 for Ex Parte Reexamination of RE45,844E (Re-exam No. 90/013,804) dated Sep. 19, 2017; 13 pages.

* cited by examiner 14-1

14-2

14-3

14-4

14-5

14-6

14-7

WATER JET MECHANISM FOR WHIRLPOOL EFFECT IN PEDICURES OR OTHER APPLICATIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

*More than one reissue application has been filed for the reissue of U.S. Pat. No. 8,272,079. The reissue applications are the present application, application Ser. No. 13/946,899, filed Jul. 19, 2013, and application Ser. No. 13/910,977, now abandoned.*

This application *is a continuation reissue of application Ser. No. 13/946,899, filed Jul. 19, 2013, which is a continuation reissue of application Ser. No. 13/910,977, filed Jun. 5, 2013, which is an application for reissue of U.S. Pat. No. 8,272,079, which* is a continuation-in-part of application Ser. No. 11/312,907 filed Dec. 20, 2005 now abandoned. The contents and disclosure of which are hereby incorporated by reference herein in their entirety.

BACKGROUND OF THE INVENTION

1. Field of the Invention

The present invention relates to a water jet mechanism and method of use in a pedicure and more particularly, to a motor in a housing having a cap.

2. Description of Related Art

It is known to have a pedicure chair with a basin for bathing the feet of a person (U.S. Patent D454,705 to Long). These types of pedicure chairs have a pipe system to introduce water into, and remove water from, the basin. The water is circulated by a conventional motor-driven, shaft mounted, fan. There is frequently water leakage around the shaft requiring maintenance. Also, the pipe system is subject to accumulation of dirt, mold and bacteria and is very difficult to clean and sterilize after use by each customer. There is the possibility of health concerns, safety and anxiety of customers.

A water circulation unit having a stator which creates a rotating magnetic field and is separated from the water by a magnetically permeable wall and a rotor on the opposite side of the wall is disclosed in U.S. Pat. No. 5,941,225 to Laing. This unit is part of a hot water distribution system which circulates cooled down hot water away from a spigot and brings in hot water such that hot water is always immediately available at the spigot.

Other water circulation means known to persons skilled in the art may also be used. A single phase synchronous motor made by Hanning Elektro-werks (Model DPO 40-020) has been used for several years in washing machines and has proven to be reliable and efficient.

There is a need for a circulating system for water in a pedicure bath which provides adequate movement of the water and which can be cleaned and sterilized rapidly and effectively to provide for the health and anxiety of persons using the pedicure bath.

SUMMARY OF THE INVENTION

It is an object of the invention to provide a system for circulating water in a bath used in a pedicure, a Jacuzzi and a whirlpool bath, the system being rapidly and easily cleaned and sanitized.

It is a further object of the invention to provide a method of preparing for use a bath used in a pedicure, a jacuzzi and a whirlpool bath.

In accordance with the teachings of the present invention, there is disclosed an improvement to a pedicure chair having a whirlpool foot bath provided with a basin, wherein water is continually ejected through respective first pipes into the basin and is thereafter withdrawn therefrom through respective second pipes and wherein mold or bacteria may tend to accumulate in the pipes, such that cleaning or sterilizing the pipes after each customer becomes difficult and time consuming, and such that customer health problems or anxieties occur. The improvement has a means for filling the basin with fresh water initially, at least one induction motor and combination pump mounted in a housing on the basin and having a removable cap provided with at least one inlet opening and at least one outlet opening for communication with the basin. In this manner, the fresh water is sucked out of the basin through the inlet opening and thereafter is discharged out of the at least one outlet opening for continually recirculating the water in the basin and thereby creating a whirlpool action therein. The induction motor and combination pump has a stator and further has a magnetically-retained rotor. After each customer, the cap may be removed, the rotor manually pulled away from the stator, and the pump quickly and conveniently cleaned or sterilized. Thereafter, the magnetically-retained motor and the cap may be easily replaced, thereby saving considerable time between customers, substantially improving customer safety, and removing customer anxieties and health concerns. The removable cap has an inner surface and an outer surface. A rim is formed circumferentially about the inner surface. The at least one inlet opening is formed centrally within the cap. A circular wall is formed on the inner surface surrounding the inlet opening. The at least one outlet opening is formed through the cap between the inlet opening and the rim. The outer surface of the cap has a circumferential wall formed about the at least one outlet opening. The wall extends outwardly from the top surface of the cap forming a nozzle thereon, such that water expelled radially from the rotor is directed axially through the at least one outlet and projected from the nozzle into the basin.

In further accordance with the teachings of the present invention, there is disclosed a jet pump mounted in a basin of a pedicure chair, jacuzzi or whirlpool bath wherein water is circulated. The jet pump has a housing having an externally accessible removable cap. The cap has an outer surface and an inner surface. A rim is formed circumferentially about the inner surface. An inlet opening for water is formed centrally within the cap, a circular wall being formed on the inner surface surrounding the inlet opening. At least one outlet for water is formed through the cap between the wall around the inlet opening and the rim. The inlet opening has a plurality of spaced-apart holes arranged in a series of concentric circles. A motor having a stator and a magnetically coupled rotor is disposed within the housing, the rotor being received within the central portion of the cap. When the motor is activated, the rotor rotates drawing water through the water inlet and expelling the water radially against the wall around the inlet opening, the water circulating within the cap and being directed axially outwardly through at least one outlet.

These and other objects of the present invention will become apparent from a reading of the following specification taken in conjunction with the enclosed drawings.

DESCRIPTION OF THE PREFERRED EMBODIMENTS

Figure 1:
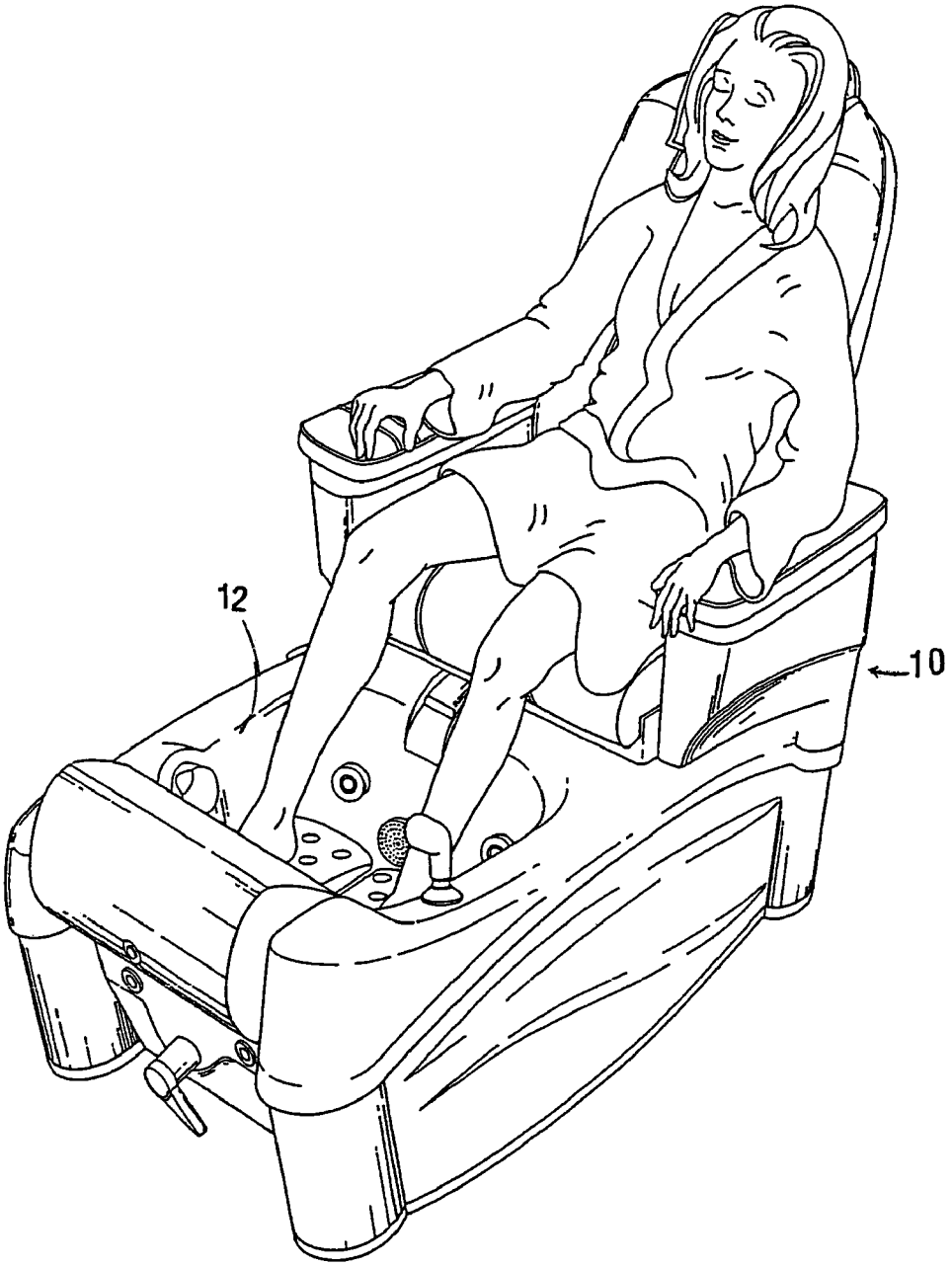
PRIOR ART Fig 1
FIG. 1 is a perspective view of a person seated in a pedicure chair with their feet in the basin.
Figure 2:
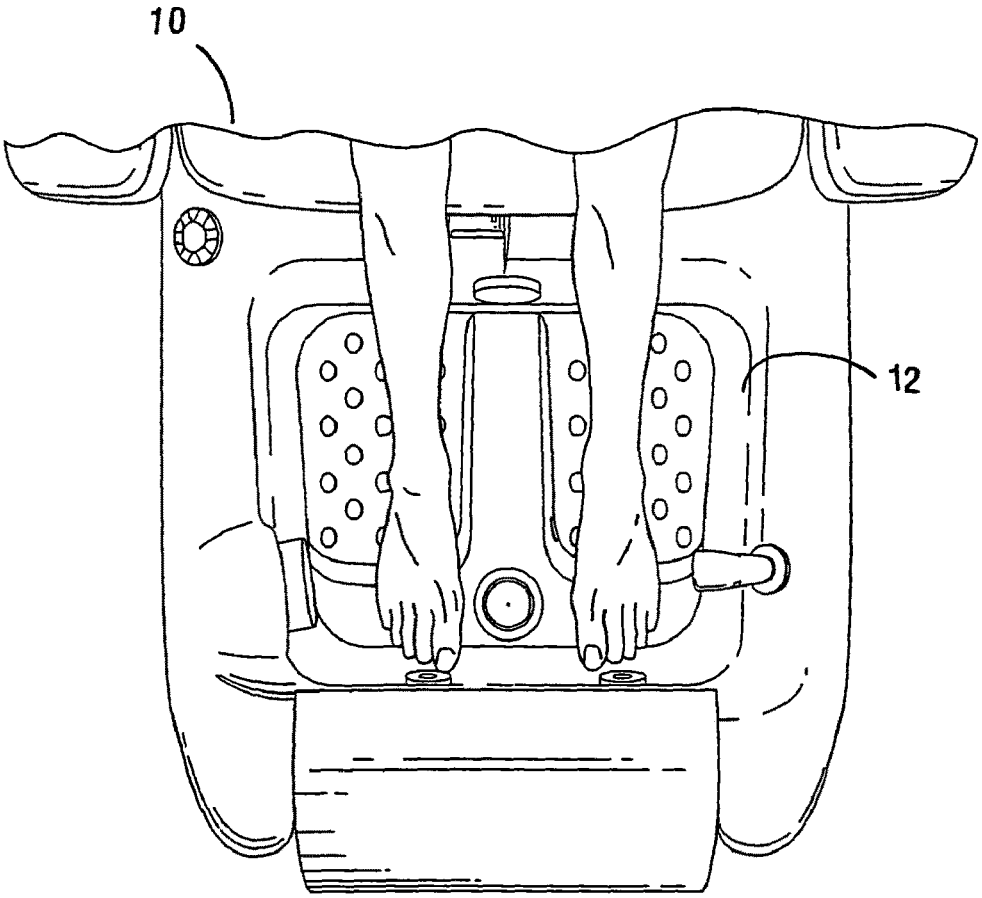
PRIOR ART Fig. 2
FIG. 2 is a top view of the basin showing the person's feet in the bath opposite from a water pump.

As shown in FIGS. 1 and 2, persons receiving a pedicure are usually seated in a pedicure chair 10 which has a basin 12 in which the person's feet are placed. Water is circulated in the basin 12 and is directed at the person's feet.

Figure 3:
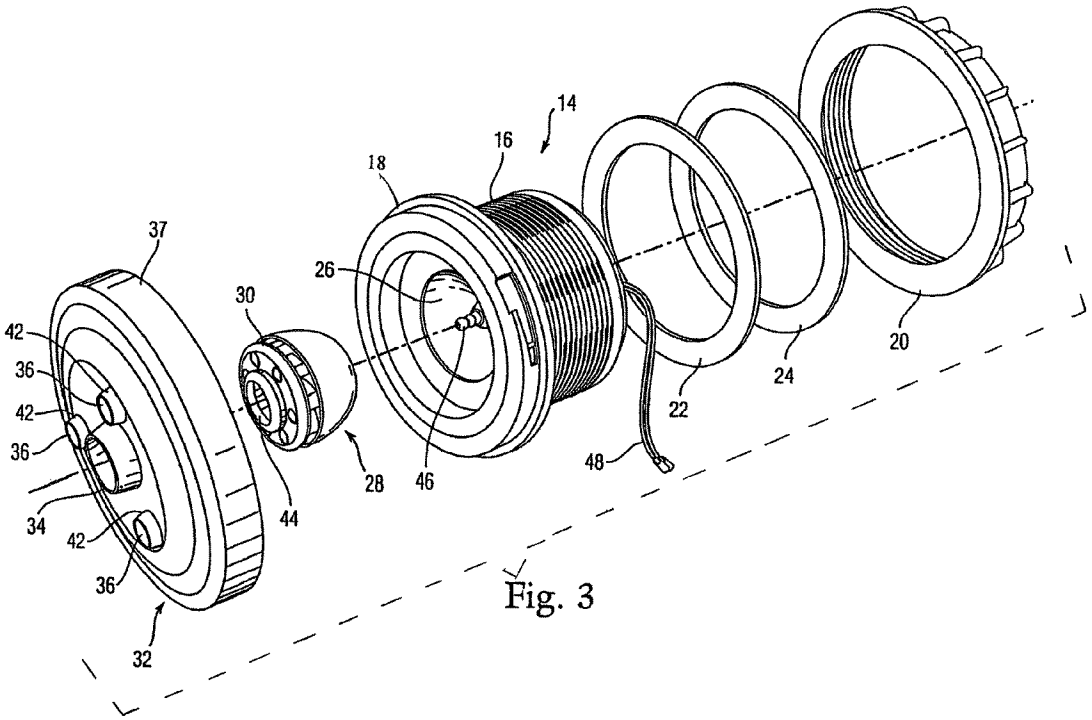
FIG. 3 is an exploded view of the present invention.
Figure 5:
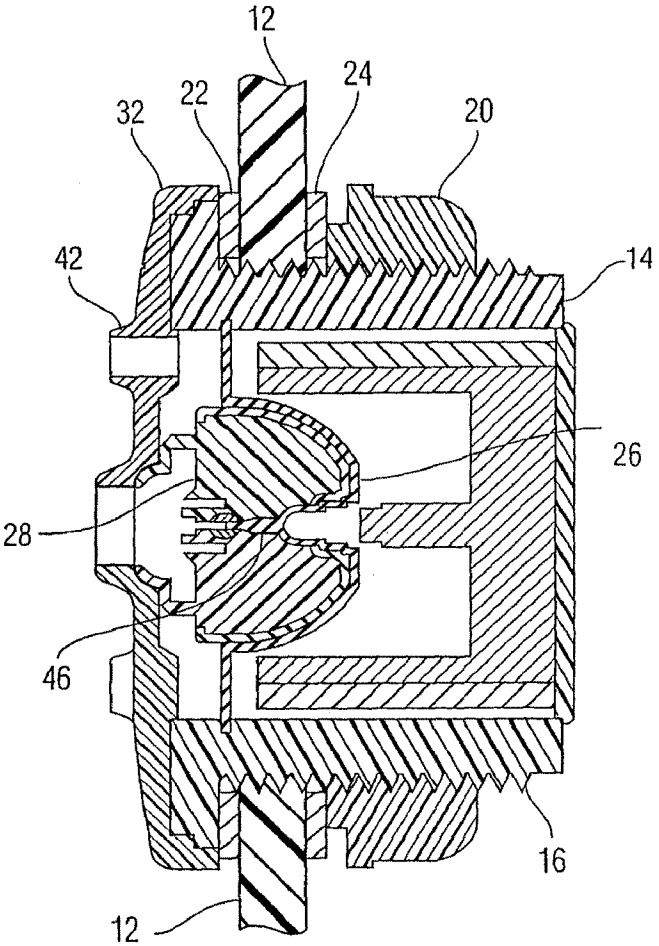
FIG. 5 is a cross section view showing the mounting of the housing in the basin.
Figure 4:
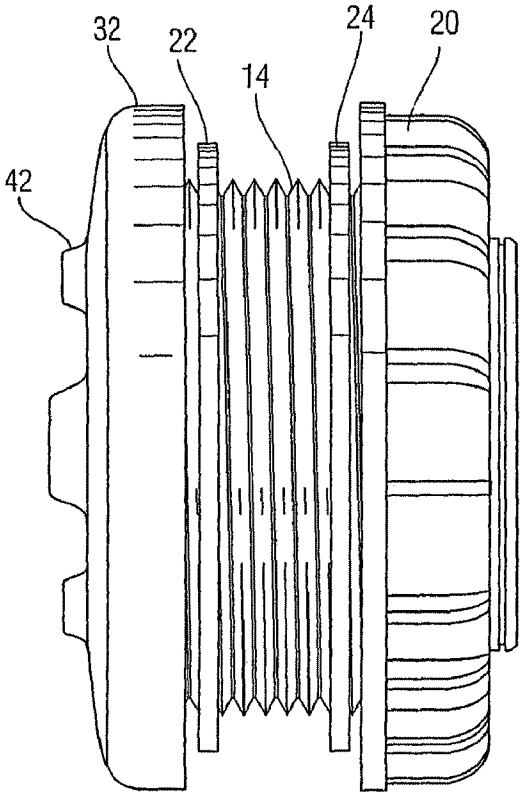
FIG. 4 is a side view of the threaded housing on which are mounted a screw ring and ring seals.

The jet pump of the present invention is shown in FIG. 3. As shown in FIGS. 4-5, a housing 14 has external threads 16 formed thereon. The first end of the housing has an enlarged shoulder 18 formed thereon. A cooperating threaded screw ring 20 is mounted on the threaded housing 14. A first seal ring 22 is disposed adjacent to the enlarged shoulder 18 on the housing and a second seal ring 24 is disposed adjacent to the screw ring 20. The basin 12 has an opening formed in the sidewall or bottom of the basin and the housing 14 is received in the opening with the seal rings 22, 24 on either side of the opening in the sidewall of the basin. Tightening of the screw ring 20 against the basin forms a watertight seal with the respective first seal ring 22 and second seal ring 24 between the basin and the housing. More than one jet pump may be mounted in the basin to provide more efficient circulation of water.

Figure 6:
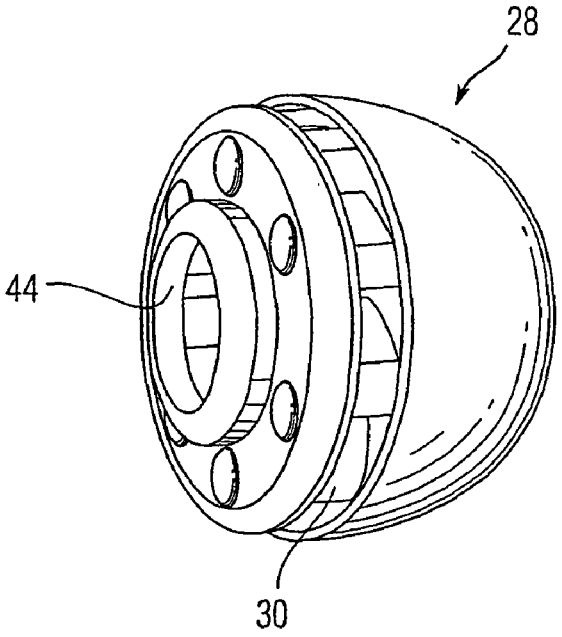
FIG. 6 is a perspective view of the rotor separated from the stator.
Figure 7:
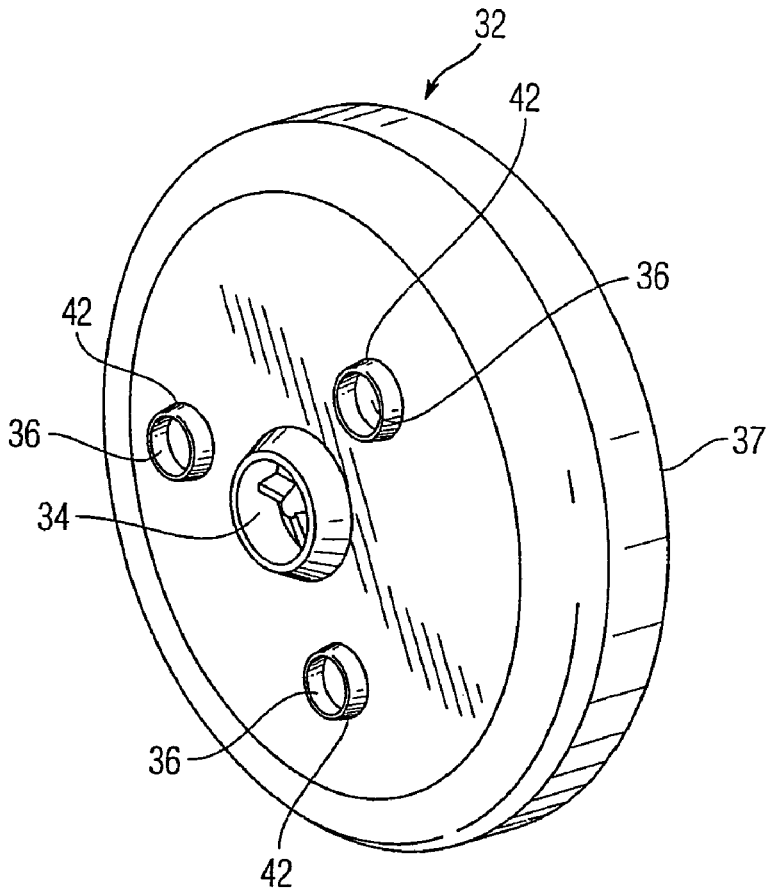
FIG. 7 is a perspective view of the outer surface of the cap to the housing.
Figure 8:
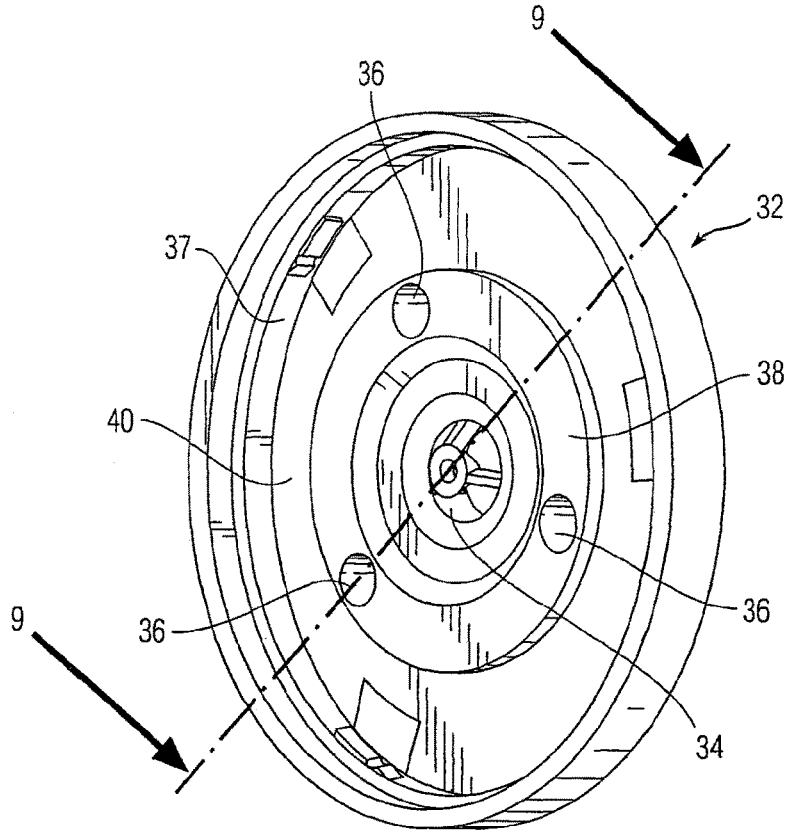
FIG. 8 is a perspective view of the inner surface of the cap of the housing.
Figure 9:
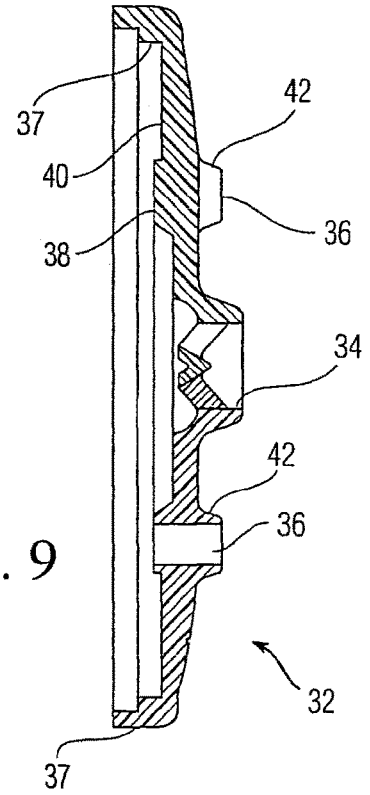
FIG. 9 is a cross-section view taken across the lines 9-9 of FIG. 8.
Figure 10:
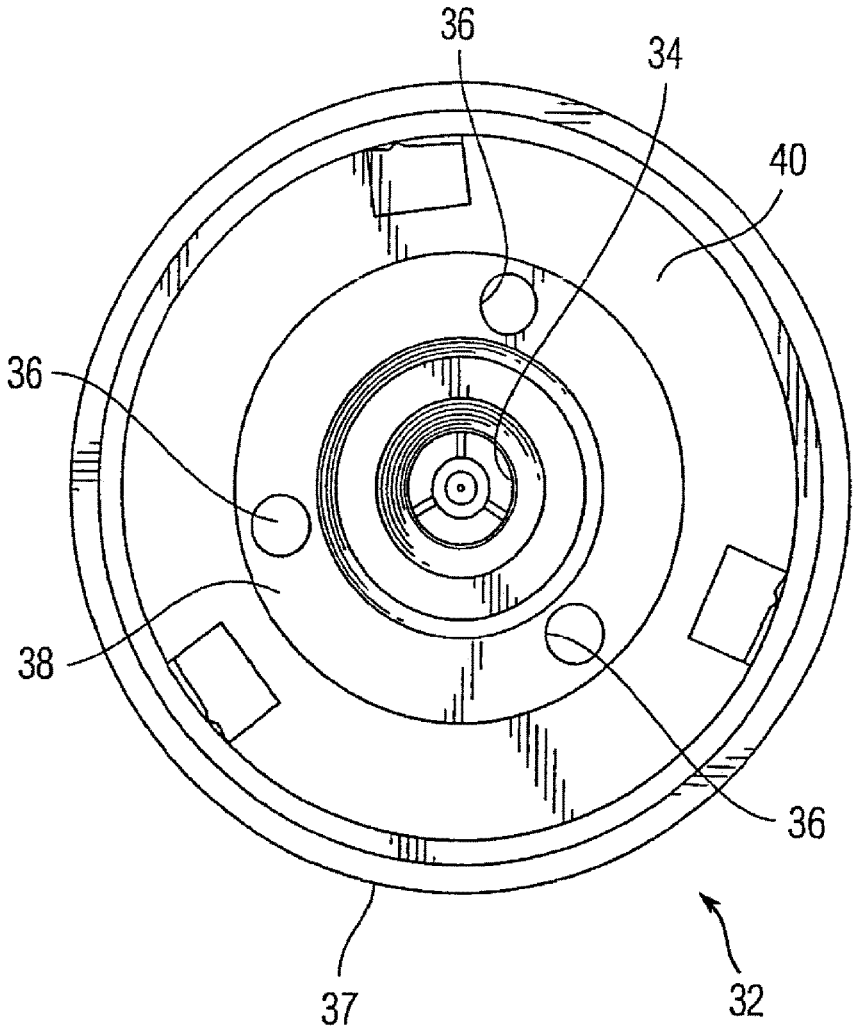
FIG. 10 is a plan view of the inner surface of the cap of the housing.

An induction motor is mounted in the housing 14. The induction motor has an electrically activated stator 26 and a permanent magnet rotor (FIG. 6). A motor which has been used satisfactorily is Model D4K-67 supplied by Laing Thermotech, Inc., San Diego, Calif. In a preferred embodiment, the stator has a well formed therein, the opening of the well being oriented toward the basin 12. The rotor has a semispherical shape which is received in the well in the stator 26. The rotor 28 may have a central bore 44 thereon and the well may have a post 46 formed centrally therein such that the rotor is always properly seated in the well. The motor has no propeller shaft. The motor has a lifetime in excess of 10,000 hours and is powered by direct current using up to 24V. The rotor 28 preferably has a plurality of vanes 30 formed circumferentially therein. When the motor is energized, water in the housing 14 is directed radially from the rotor 28 due to the rotation of the rotor and the vanes in the rotor.

The present invention is not limited to use with an induction motor. A single plane synchronous motor 59 such as Model DPO 40-020 available from Hanning Elektrowerks GmbH & Co. has been used successfully (FIGS. 21-27). This motor has an impeller 58 mounted on the end of a drive shaft. The impeller 58 is manually removable from the motor for cleaning between use by each person using the pedicure chair. Preferably, the impeller 58 has a surface 60 with a plurality of vanes 62 formed on a first side. A pocket 64 is formed on a second side of the surface 60 forming a watertight seal around a bore 66 which is formed in the motor. A drive shaft 68 is connected to the second side of the surface 60 of the impeller 58. The drive shaft 68 passes through the gasket 64 and is received in the bore 66 in the motor.

As shown in FIGS. 7-10, the cap 32 to the housing 14 is retained on the housing with a twist lock fitting for ease of manual attachment and removal. In the central portion of the cap 32, there is an opening 34 which serves as a water inlet. Also, there is at least one and preferably three equidistance spaced-apart, outlets 36 formed in the cap 32 outwardly of the inlet 34. An annular rim 37 is formed about the outer surface of the cap 32. The inner surface of the annular rim 37 defines the circumference of the inner surface of the cap 32. The inner surface of the cap 32 has a raised ring 38 formed thereon. The ring 38 is oriented toward the rotor 28 and surrounds the central portion and the water inlet opening 34. Between the raised ring 38 and the outer edge of the cap 32, there is formed a trepan 40. Further formed in the raised ring 38 there is at least one, and preferably three, openings which are the outlet ports 36 or discharge ports. In the embodiment with three outlets, it is preferred that the outlets are spaced apart 120° from one another. The outlet ports 26 pass through the cap 32 and, on the outer surface of the cap 32, there is a circumferential wall 42 around each outlet port 36 forming a respective nozzle.

Figure 11:
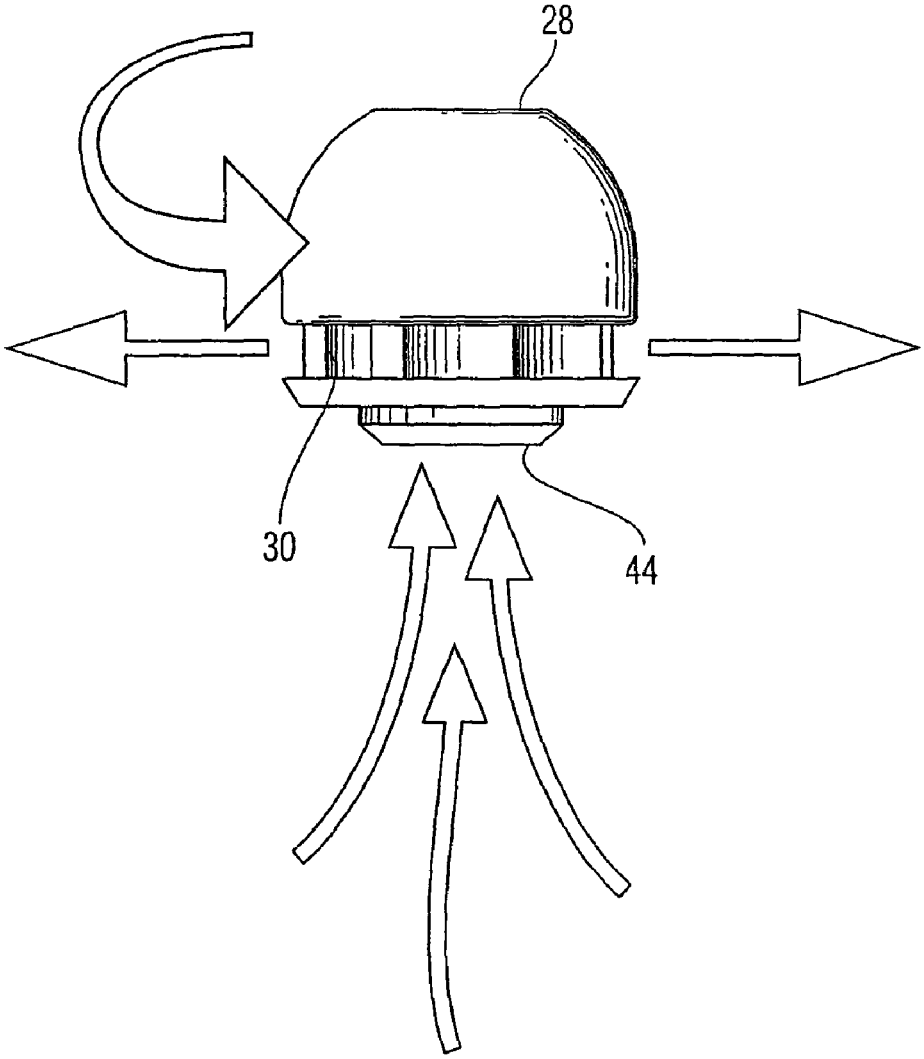
FIG. 11 is a side elevation view showing the rotor in rotation and the movement of water radially from the rotor.
Figure 12:
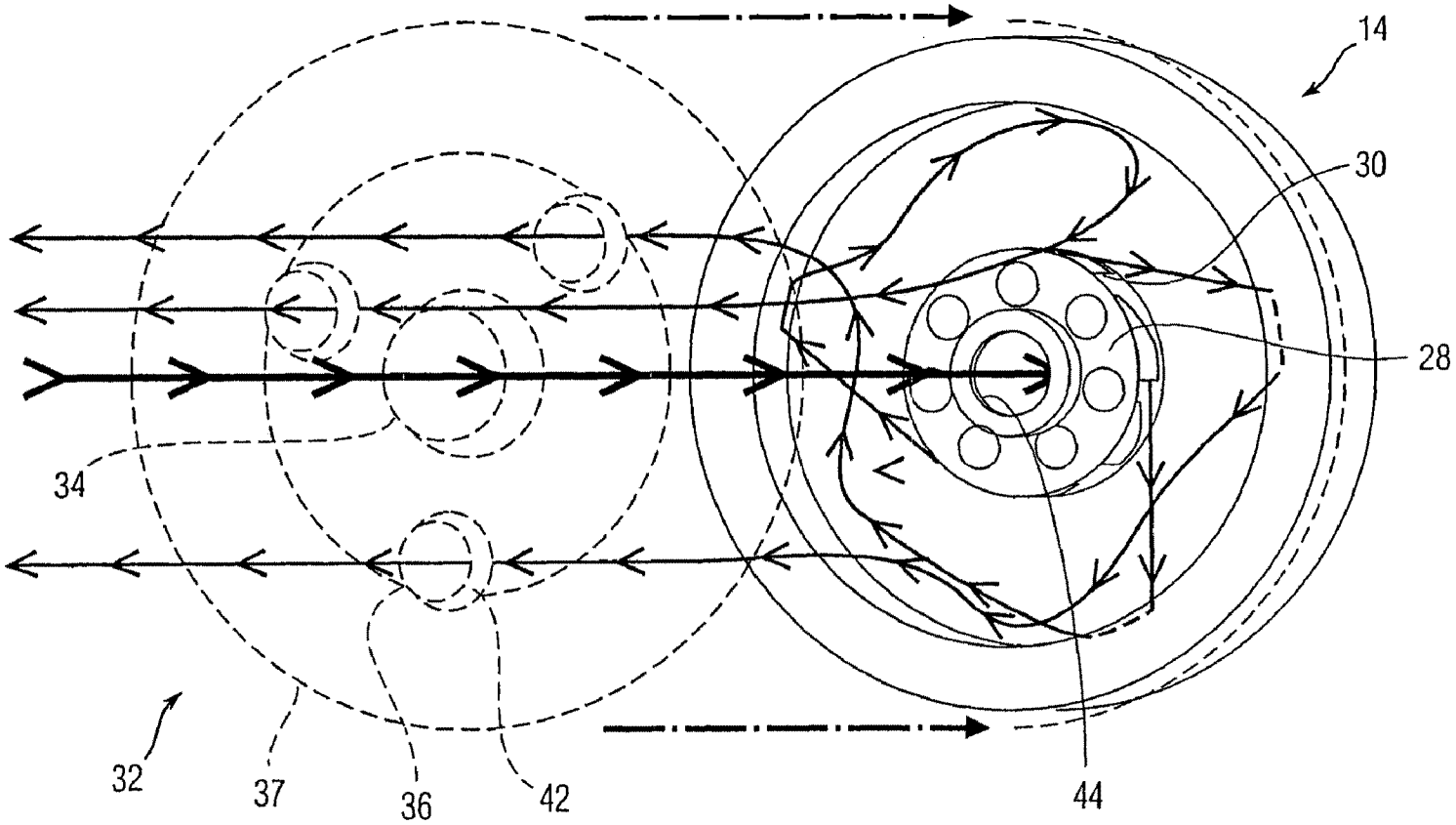
FIG. 12 is a diagram showing the movement of water within the cap.
Figure 13:
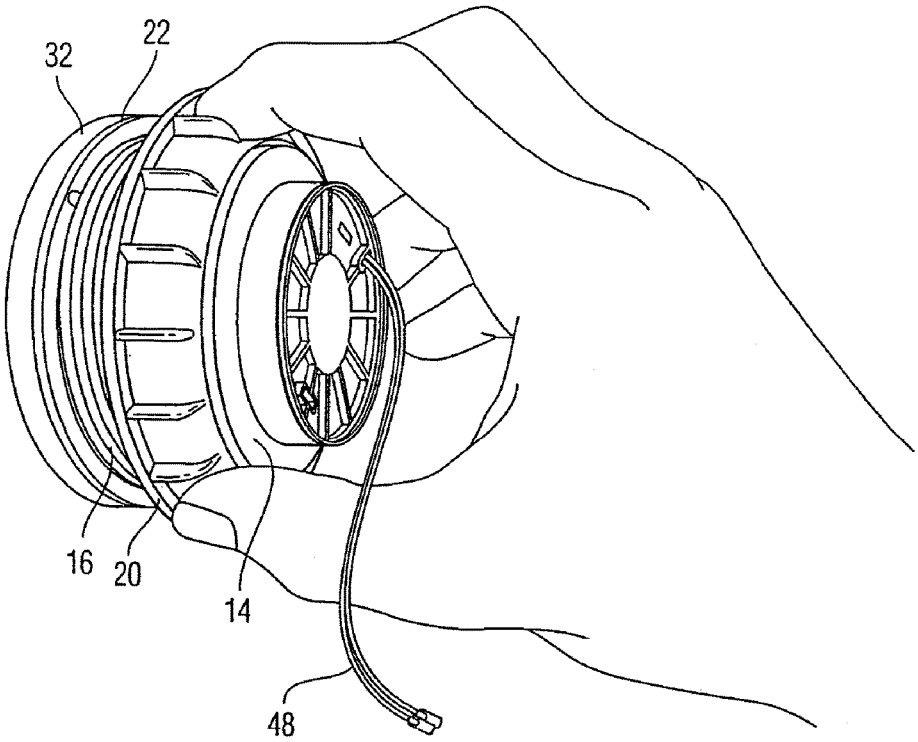
FIG. 13 is a perspective view showing removal of the back ring to access the motor for replacement.

As shown in FIGS. 11-12, water within the basin 12 is drawn into the intake opening 34 in the center of the cap 32 by rotation of the rotor 28. The vanes in the rotor 28 expel the water radially across the trepan 40. The water is contained by the annular rim 37 and circulates within the cap 32 and is directed axially through the plurality of discharge port outlets 36. When leaving the outlets 36, the circumferential wall 42 on the outlet acts as a nozzle to forcefully direct the water into the basin 12 producing agitation, circulation and a whirlpool effect on the water within the basin.

The stator 26 is electrically connected to a low DC voltage power source using a quick-disconnect fitting 48. The stator 26 is in the housing 14 with the wiring on the opposite side from the rotor 28 and distal from the basin 12, Access to the wiring is through the back or side of the pedicure chair 10 permitting servicing of the motor (FIG. 12).

Figure 14:
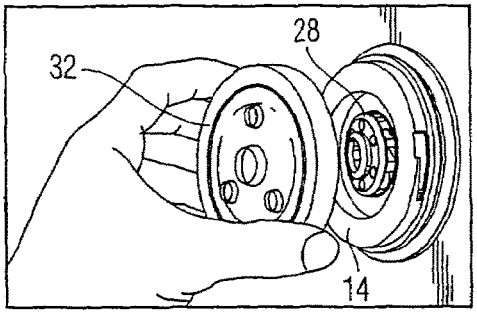
FIG. 14 is a flowchart showing the method of preparing, cleaning and using the pedicure bath.
Figure 14:
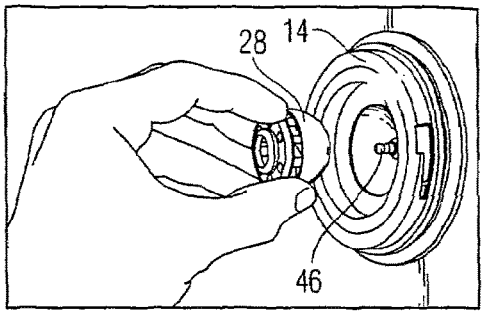
Figure 14:
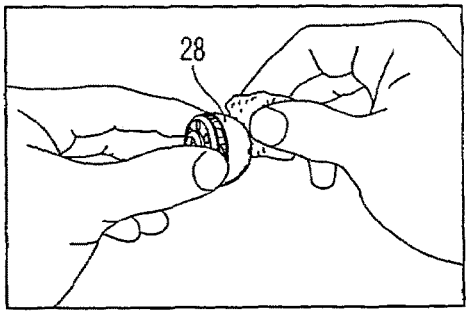
Figure 14:
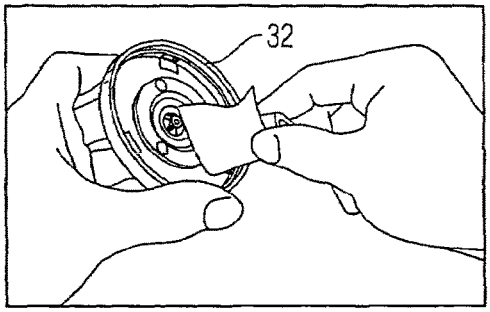
Figure 14:
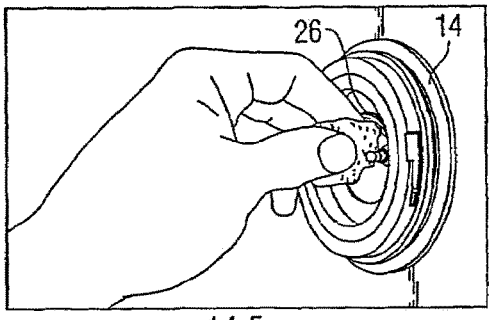
Figure 14:
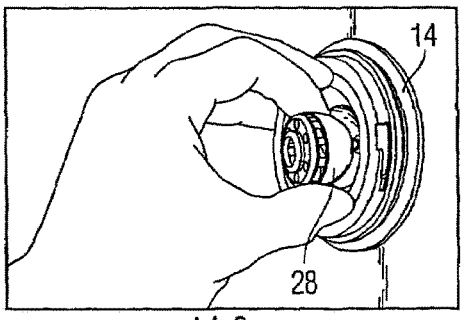
Figure 14:
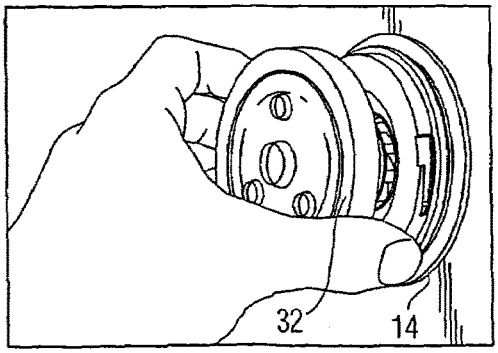

In a typical use (FIG. 14), the pedicure chair is prepared for a customer by manually twisting and removing the cap 32. The inner surface and outer surface of the cap 32 are wiped with a cloth/tissue having a sterilizing/cleaning material, such as alcohol, thereon. Alternately, the cap 32 may be immersed in a sterilizing/cleaning solution. The rotor 28 is manually removed from the stator 26 and cleaned/sterilized in a manner as performed with the cap 32. The stator 26 and the entire inner surface of the housing 14 are wiped with a cloth/tissue having a sterilizing/cleaning material thereon. The cleaned rotor 28 is replaced on the stator 26. Note that due to the magnetic nature of the rotor, it is strongly attracted to the stator. Simply disposing the rotor near the well in the stator is sufficient to have the rotor seat itself in the well with the post 46 in the well received in the bore 44 in the rotor. No tools or special handling are required. The cleaned cap is manually attached to the housing without the need for any tools. The interior of the basin is cleaned/sterilized by wiping with a cloth/tissue having a cleaning/sterilizing material thereon. A predetermined amount of water is placed in the basin. If desired, additional substances such as conditioners, medicaments, fragrances, etc. may be placed in the basin with the water. A customer is seated in the pedicure chair 10 with their feet oriented toward the at least one housing. The motor is activated to circulate the water in the basin and the water is circulated as required for the pedicure. After the pedicure procedure is completed and the customer leaves, the basin is emptied of water and the basin, cap, rotor and interior of the housing and stator are sterilized/cleaned using the above described procedure. The cleaning/sterilizing procedure is completed in approximately one minute or less.

In an alternate embodiment (FIGS. 17-20) the removable cap 32' has an inner surface and an outer surface. A rim 50 is formed circumferentially about the inner surface. At least one inlet opening 34' is formed centrally with the cap 32'. A circular wall 52 is formed on the inner surface surrounding the inlet opening 34'. At least one outlet opening 36' is formed through the cap 32' between the inlet opening 34' and the rim 50. In an embodiment having three (3) outlet openings 36', they are preferably spaced apart 120° from each other. On the outer surface of the cap, each outlet opening has a circumferential wall 42' formed thereabout. The wall 42' extends outwardly from the top surface of the cap forming a nozzle about the respective outlets 36'. Water expelled radially from the cap is directly axially and is projected from the nozzle into the basin. Preferably, the inlet opening 34' has a plurality of spaced-apart holes 54 arranged in a series of concentric circles. The series of spaced-apart holes are formed on a convex dome 56 extending above the outer surface of the cap 32'.

Irrespective of the type of motor used in the housing, the inlet opening 34 in the cap 32 is centrally disposed so that the inlet opening is opposite the motor or the impeller and water is drawn from the basin 12 through the inlet opening 34.

Figure 15:
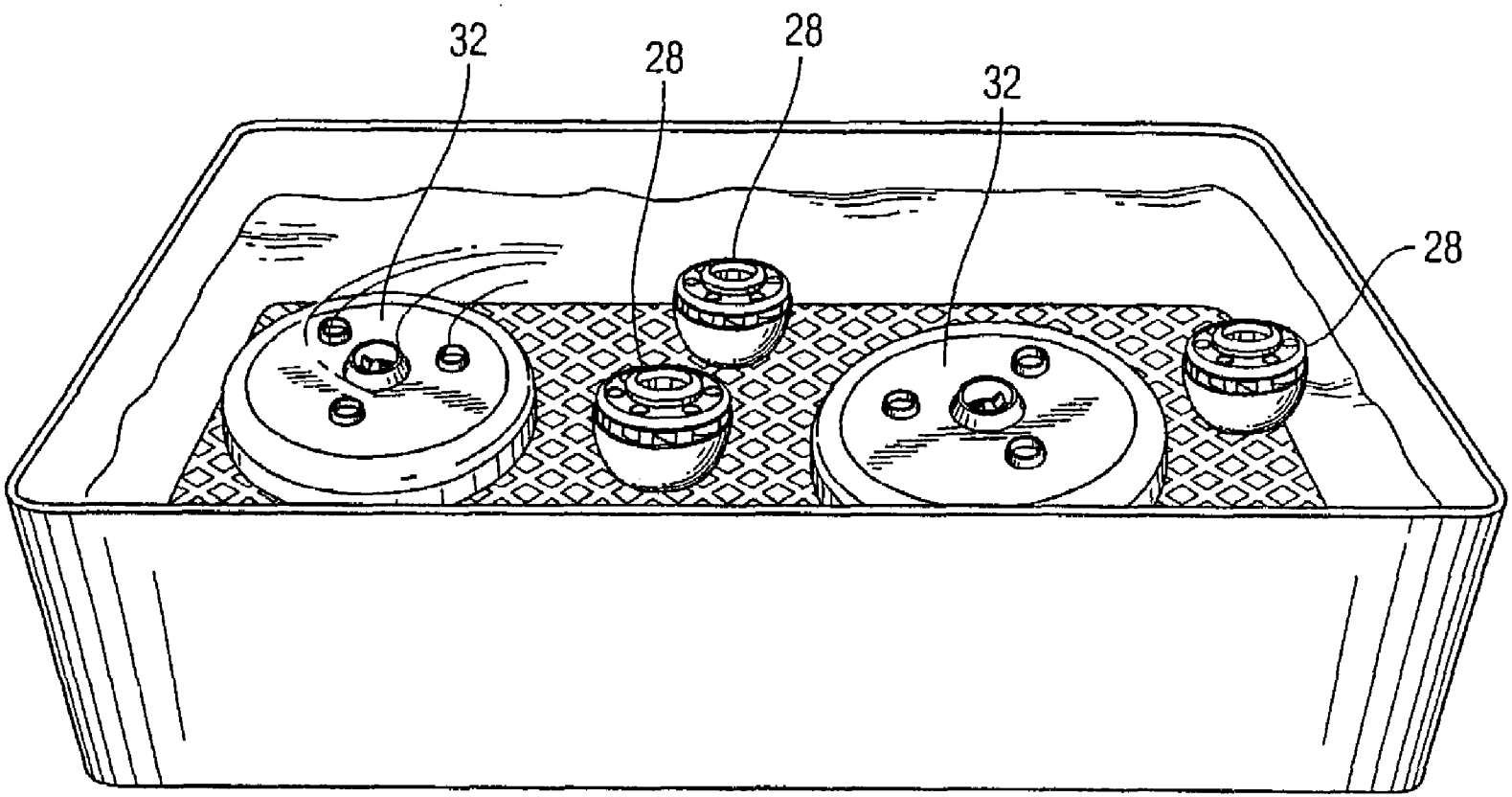
FIG. 15 is a perspective view showing a plurality of extra rotors and caps in a sterilizing solution to be used to rapidly prepare the basin for the next customer.
Figure 16:
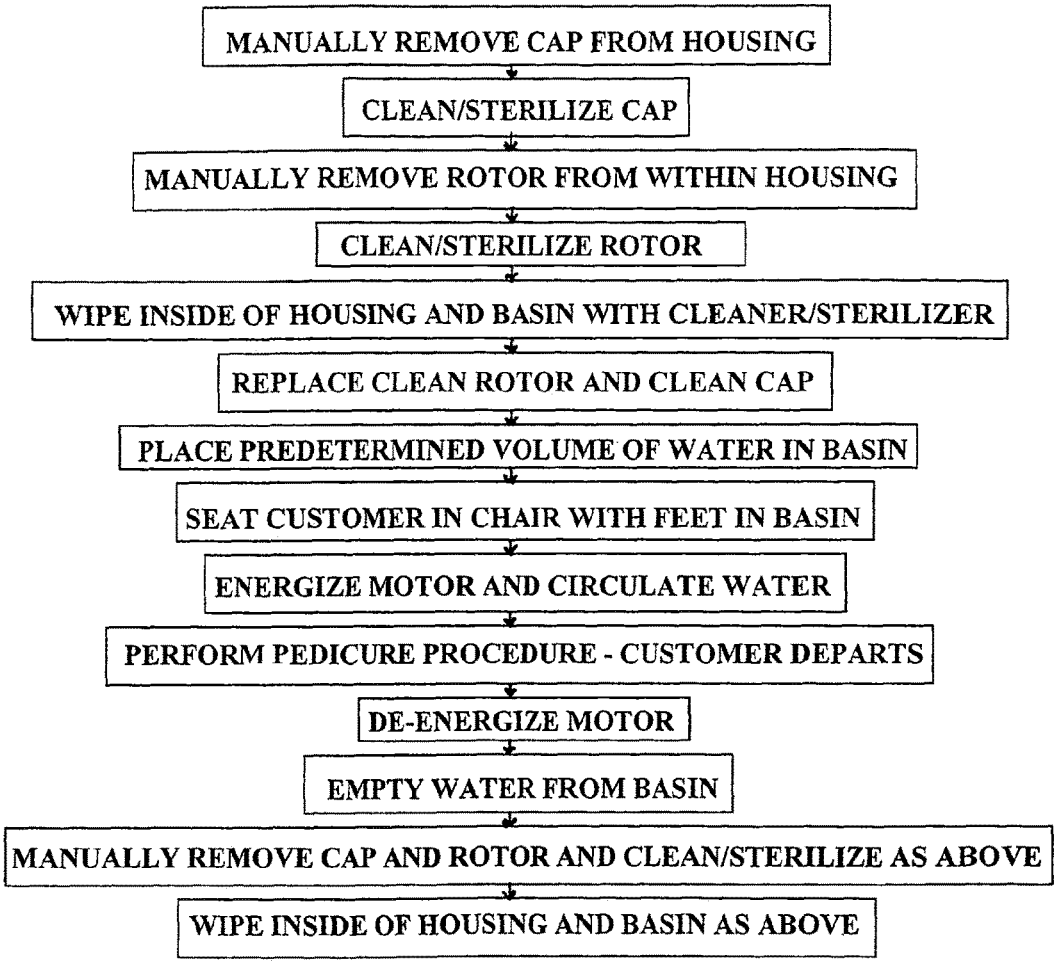
FIG. 16 is a flowchart showing the preparation and use of the pedicure chair incorporating the present invention.
Figure 17:
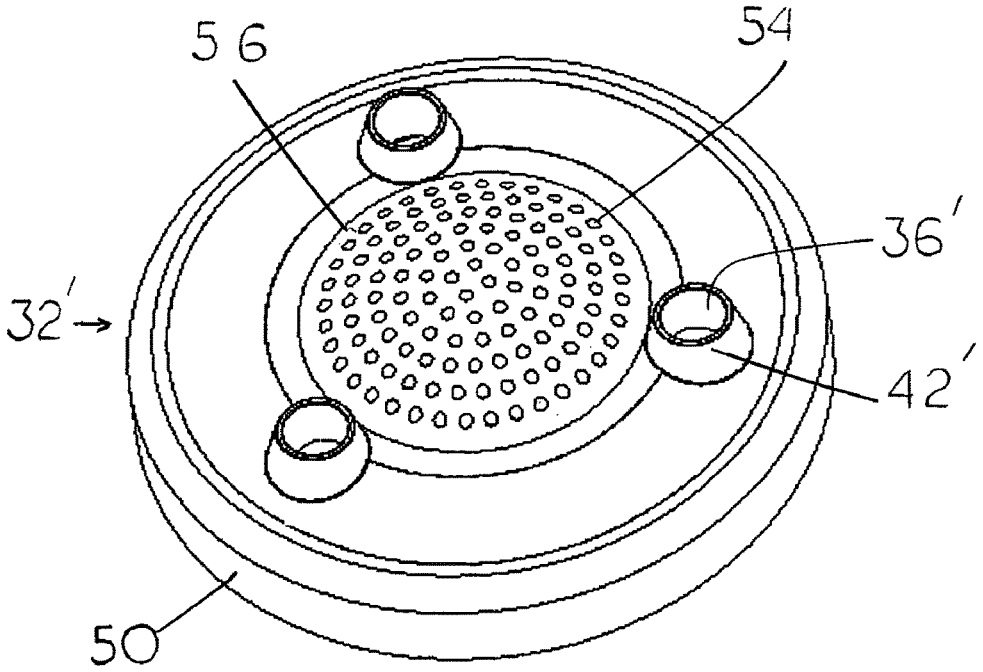
FIG. 17 is a perspective view of the top of the alternative cap to the housing.
Figure 18:
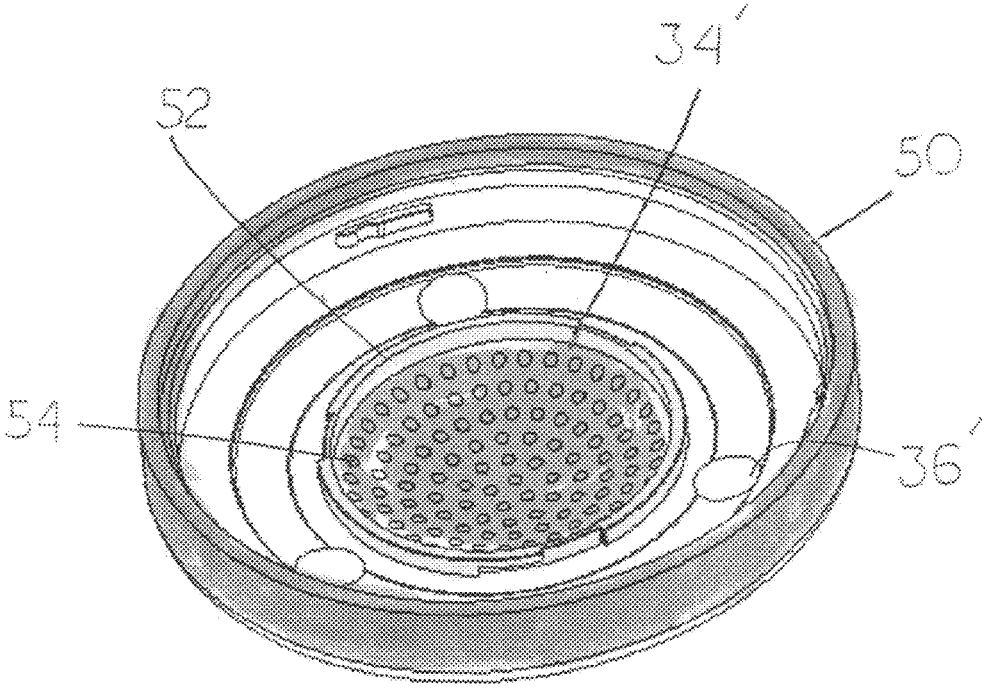
FIG. 18 is a perspective view of the bottom of the alternative cap to the housing.
Figure 19:
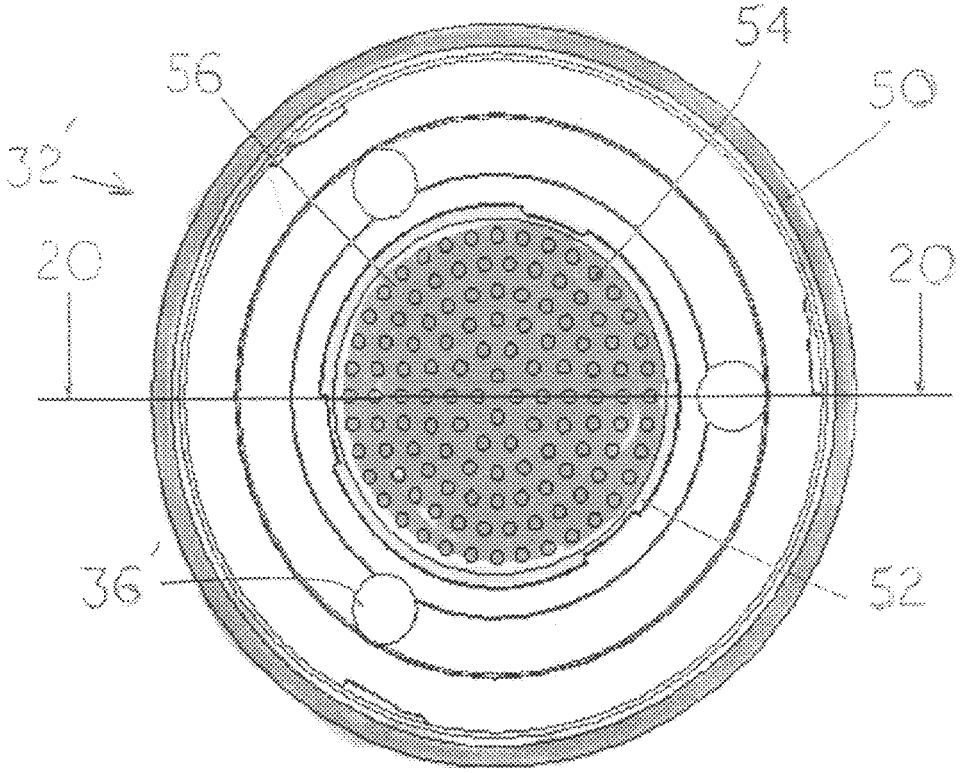
FIG. 19 is a bottom plan view of the alternative cap to the housing.
Figure 20:
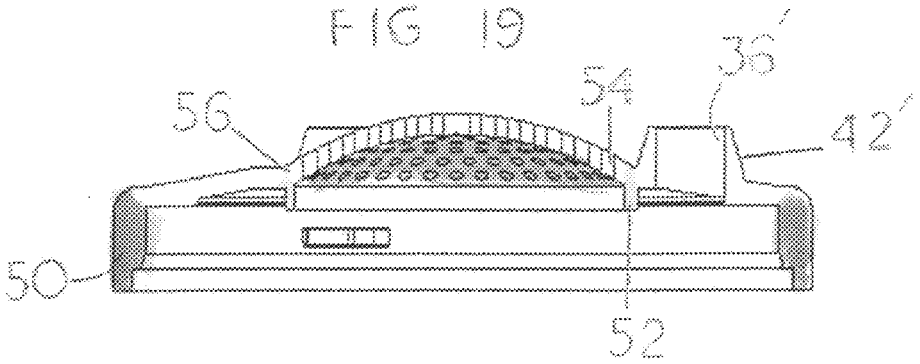
FIG. 20 is a cross-sectional view taken across the lines 20-20 of FIG. 19.
Figure 21:
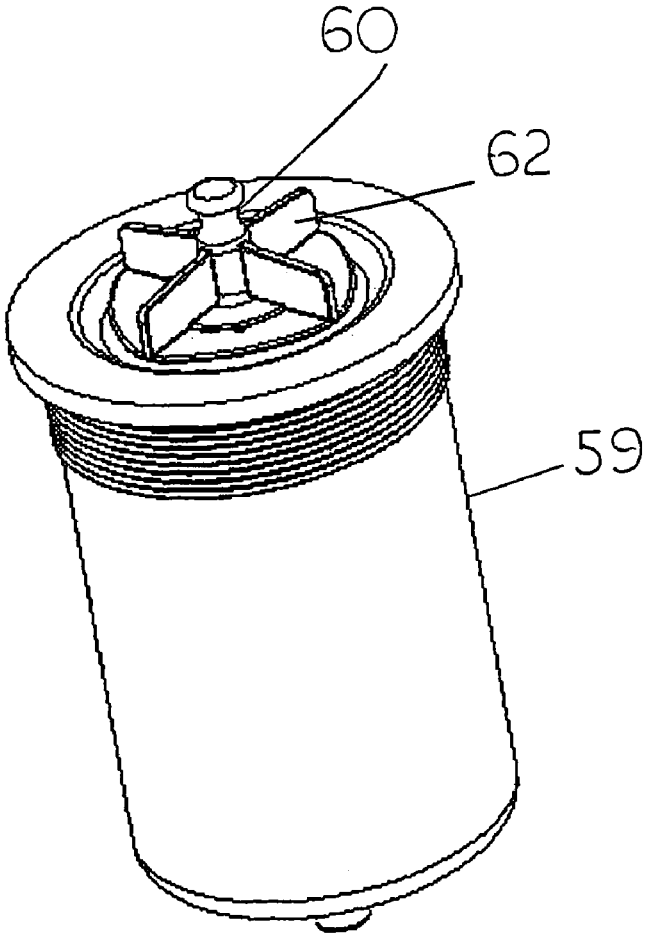
FIG. 21 is a perspective view of the motor having an impeller used with the alternative cap to the housing.
Figure 22:
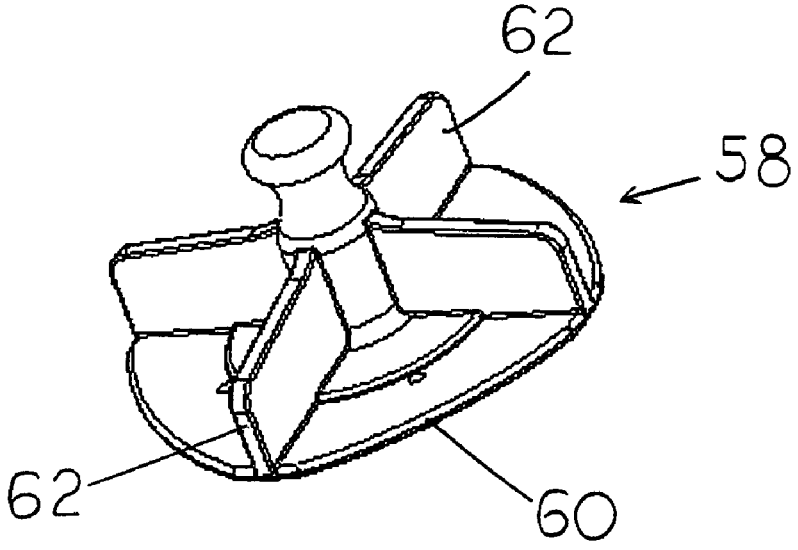
FIG. 22 is a perspective view of the top of the impeller.
Figure 23:
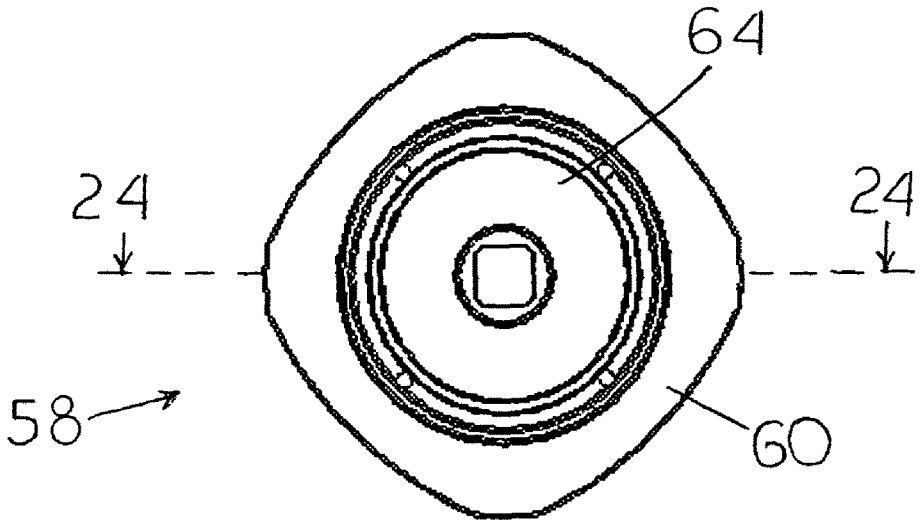
FIG. 23 is a bottom plan view of the impeller.
Figure 24:
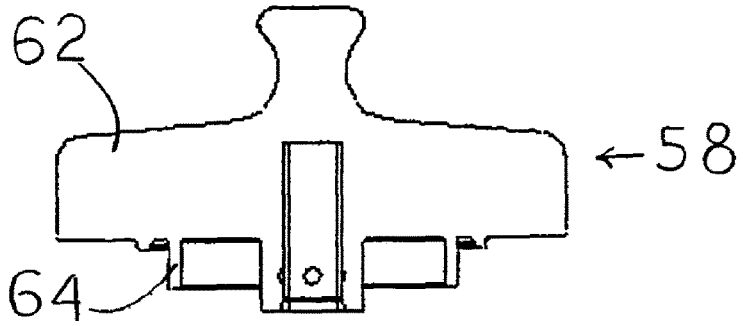
FIG. 24 is a cross-sectional view taken across the lines 24-24 of FIG. 23.
Figure 25:
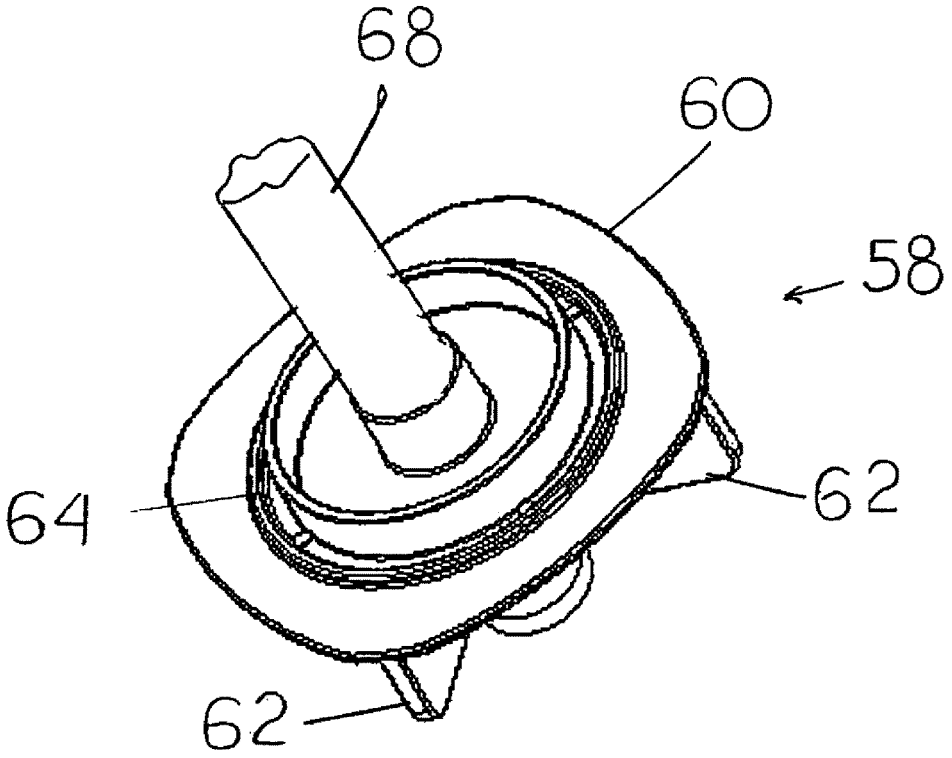
FIG. 25 is a perspective view of the bottom of the impeller.
Figure 26:
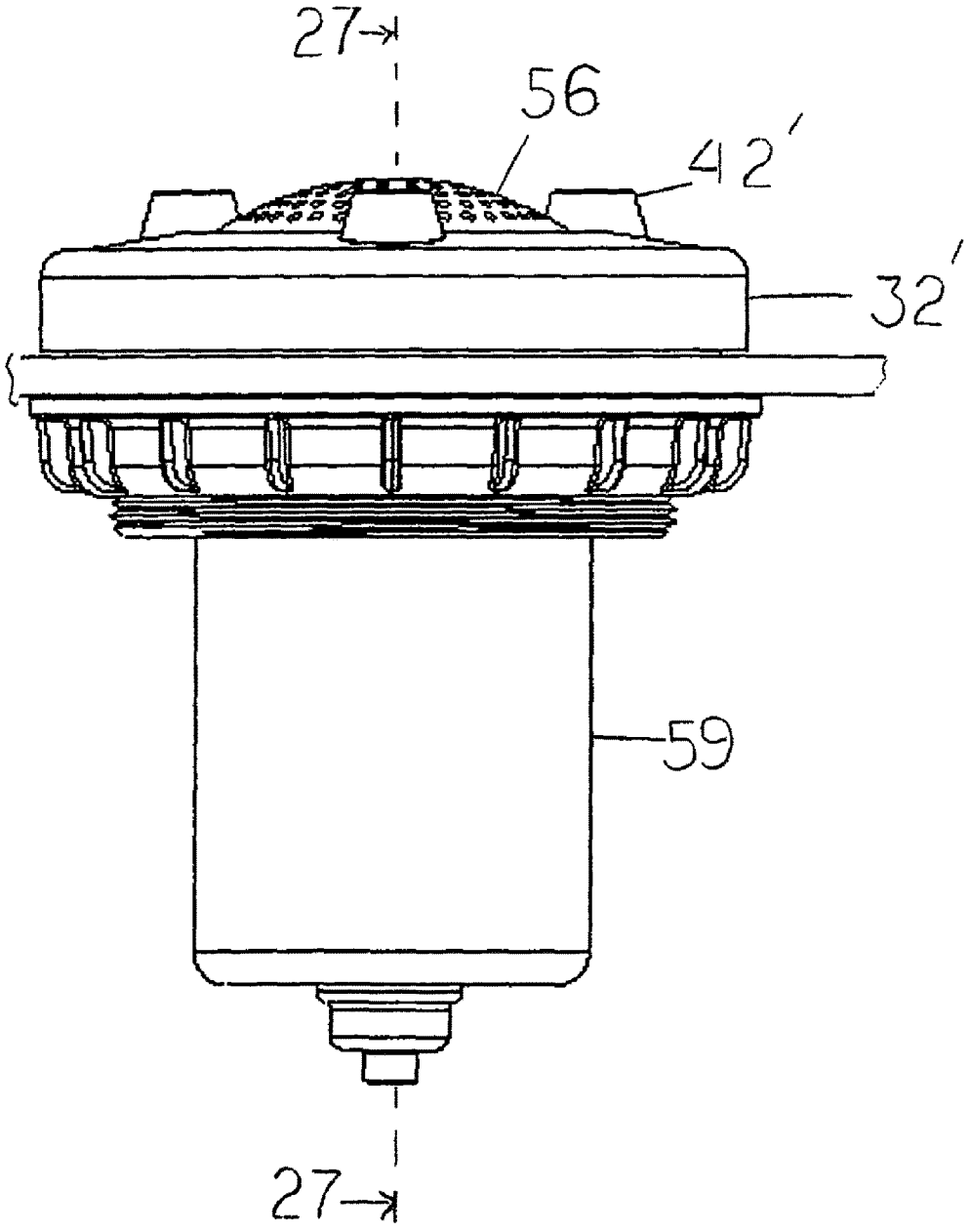
FIG. 26 is a side elevation view of the motor in the housing with the alternative cap mounted in the basin.
Figure 27:
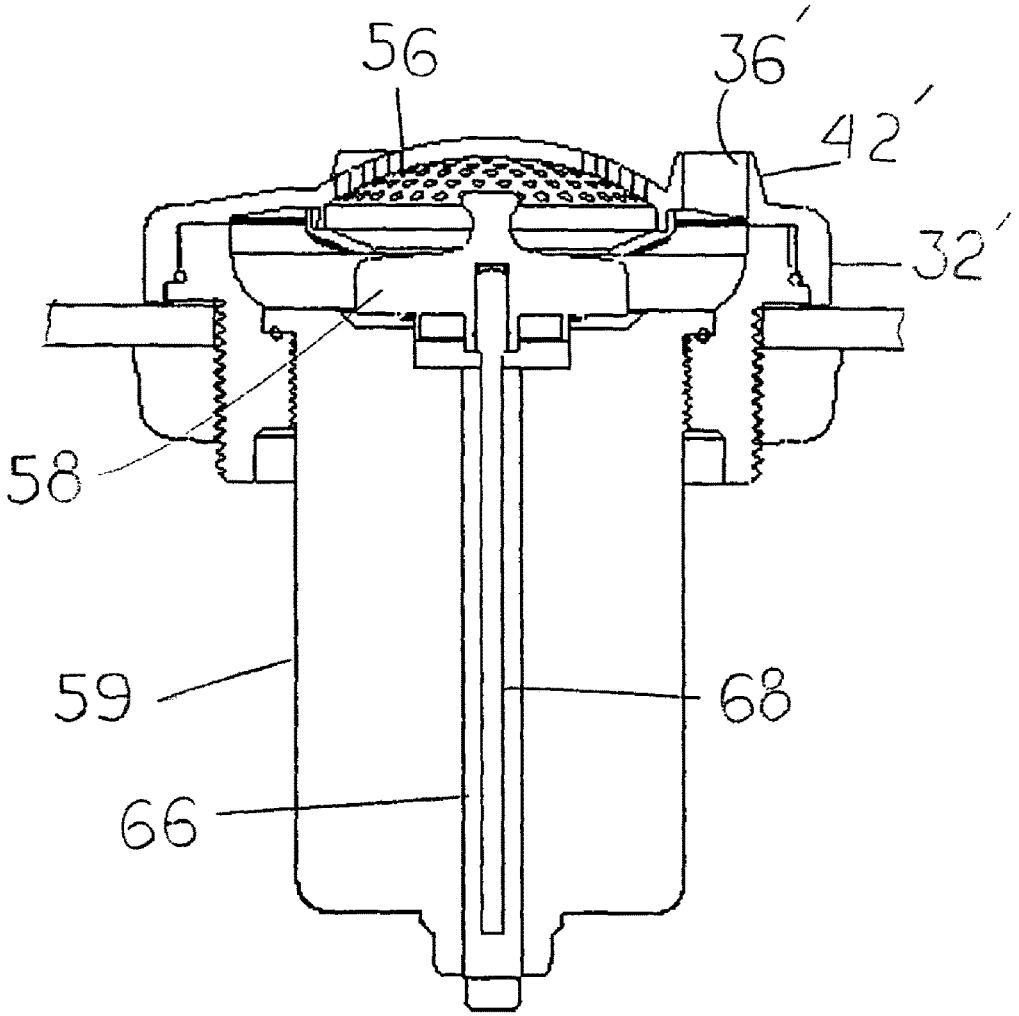
FIG. 27 is a cross-sectional view taken across the lines 27-27 of FIG. 26.

Alternately, there could be provided additional caps and rotors which are maintained in a cleaning/sterilizing bath or are kept in a cleaned/sterilized condition (FIG. 15). These clean components cold be used to replace the caps and/or rotors which are to be cleaned. This would further shorten the time to clean the pedicure chair for the next customer. A diagrammatic flowchart of use is presented in FIG. 16.

In the current state-of-the-art, the basin may be wiped with a cloth/tissue having a sterilizing/cleaning material, but is not possible to adequately clean the motor/fan used to circulate the water. Further, in the present chairs, there are pipes through which the water circulates and it is not possible to adequately clean these thoroughly. The absence of dirt, mold or bacteria in these pipes and/or on the motor/fan cannot be assured. Thus, in the present chairs, the alternatives are 1) do not sterilize/clean which can produce unsanitary, dermatological problems for customers, 2) conduct a partial cleaning which is inadequate, or 3) conduct a thorough cleaning which may require approximately 20 minutes and cannot assure the cleanliness of the pipes.

The present invention provides a method of using a pedicure chair which assures that the bath for the customer is safe and sanitary and which can be prepared in a relatively short time.

Although the above description is directed to a pedicure chair, the device may be used in a jacuzzi, whirlpool bath or similar item.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

[1. A jet pump mounted in a basin of a pedicure chair, or whirlpool bath wherein water is circulated, the jet pump comprising:

a housing having an externally accessible removable cap, the cap having an outer surface and an inner surface, a rim formed circumferentially about the inner surface, an inlet opening for water formed centrally within the cap, a wall being formed circumferentially on the inner surface of the cap surrounding the inlet opening between the inlet opening and the rim, the wall extending from the inner surface of the cap and directed toward the motor, at least one outlet for water formed through the cap radially between the wall around the inlet opening and the rim, the at least one outlet having a nozzle thereabout formed on the outer surface of the cap whereby water is projected from the nozzle into the basin, the inlet opening having a plurality of spaced-apart holes, a motor having an impeller to draw water toward the motor, the motor being disposed within the housing, and the impeller being oriented opposite the inlet opening of the cap, wherein when the motor is activated, the impeller is rotated, the water is drawn through the water inlet and the water is expelled radially against the wall around the inlet opening, the water circulating within the cap and being directed axially outwardly through the at least one outlet.]

[2. The jet pump of claim 1, wherein the series of spaced-apart inlet holes are formed on a convex dome extending above the outer surface of the cap.]

[3. The jet pump of claim 1, wherein the impeller is manually removable for cleaning.]

*4. A jet pump configured to be mounted in a basin of a pedicure chair or in a whirlpool bath wherein water is circulated, the jet pump comprising:*

*a housing supporting a motor having a stator and a rotor and configured to rotatingly drive a plurality of vanes about an axis, the housing comprising a shoulder configured to mount the housing to a wall of the pedicure chair or whirlpool bath so that a housing front part extends into the basin;*

*a cap having an outer surface and an inner surface, the cap releasably engaged with the housing front part so as to define a pump chamber between the cap inner surface and a surface of the housing front part, the cap comprising a plurality of spaced-apart holes formed through the cap and defining an inlet aligned with the axis, and an outlet opening through the cap inner surface, the outlet opening being radially spaced from the inlet;*

*the plurality of vanes disposed within the pump chamber and rotatable by the rotor to draw water axially through the inlet and direct the water radially and out the outlet opening;*

*the surface of the housing front part within the pump chamber comprising a flat portion and an outer portion, the outer portion extending in a direction transverse to the flat portion and terminating at an outer edge, the outer edge forming an unbroken circle, and when the cap is engaged with the housing front part the outer edge engages the cap inner surface and the outlet opening of the cap is adjacent the outer edge; and*

*a first point along the cap inner surface being defined at the inlet, a second point along the cap inner surface being defined adjacent the outlet opening, the first point and second point being spaced radially and axially relative to one another.*

*5. A jet pump as in claim 4, wherein a reference plane is defined by the flat portion of the surface of the housing front part in the pump chamber and is normal to the axis, and wherein moving radially from the first point to the second point a distance between the cap inner surface and the reference plane progressively decreases without increasing.*

*6. A jet pump as in claim 5, wherein a radially flat portion of the cap inner surface is defined between the first point and the second point, and wherein the distance between the cap inner surface and the reference plane does not decrease moving radially across the radially flat portion.*

*7. A jet pump as in claim 5, wherein a distance between the second point and the reference plane is less than a distance between the first point and the reference plane.*

*8. A jet pump as in claim 4, wherein a reference plane is defined by the flat portion of the housing front part surface within the pump chamber and is normal to the axis, and wherein a distance between the second point and the reference plane is less than a distance between the first point and the reference plane.*

*9. A jet pump as in claim 4, wherein the outlet opening opens into an elongate nozzle having a downstream nozzle opening that is spaced from the cap outer surface.*

*10. A jet pump as in claim 9, wherein the cap is unitary.*

*11. A jet pump as in claim 4, further comprising a second outlet opening spaced radially from the inlet and from the outlet opening.*

*12. A jet pump as in claim 4, wherein a first elongate radially extending portion of the cap inner surface in the inlet is inclined relative to the axis, a second elongate radially extending portion of the cap inner surface is normal to the axis, and a third elongate radially extending portion of the cap inner surface is inclined relative to the axis, the second portion being between the first and third portions.*

*13. A jet pump as in claim 4 further comprising an inlet passage that rotates with the vanes, the inlet passage interposed between the vanes and the cap inner surface and aligned with the inlet.*

*14. A jet pump as in claim 4, wherein the vanes are mounted on the rotor.*

*15. A jet pump configured to be mounted in a basin of a pedicure chair or in a whirlpool bath wherein water is circulated, the jet pump comprising:*

*a housing supporting a motor having a stator, the housing comprising a shoulder configured to mount the housing to a wall of the pedicure chair or whirlpool bath so that a housing front part extends into the basin, the motor configured so that no propeller shaft of the motor extends through the housing front part;*

*a rotor that is magnetically drawn toward the stator and which comprises a plurality of vanes, the stator and rotor configured so that the motor, when actuated, rotates the rotor about an axis;*

*a cap having an outer surface and an inner surface, the cap releasably engaged with the housing front part so as to define a pump chamber between the cap inner surface and a surface of the housing front part, the cap comprising a plurality of spaced-apart holes formed through the cap and defining an inlet aligned with the axis, and an outlet opening through the cap inner surface, the outlet opening being radially spaced from the inlet;*

*the rotor and the plurality of vanes disposed within the pump chamber, the plurality of vanes configured to rotate with the rotor to draw water axially through the inlet and direct the water radially and out the outlet opening;*

*the surface of the housing front part within the pump chamber comprising a flat portion and an outer edge portion, the outer edge portion extending in a direction transverse to the flat portion; and*

*a first point along the cap inner surface being defined at the inlet, a second point along the cap inner surface being defined adjacent the outlet opening, the first point and second point being spaced radially and axially relative to one another.*

*16. A jet pump as in claim 15, wherein the outer edge portion of the surface of the housing front part within the pump chamber is circular.*

*17. A jet pump as in claim 16, wherein the outlet opening of the cap is adjacent the outer edge portion when the cap is engaged with the housing front part.*

*18. A jet pump as in claim 17, wherein the outlet opening opens into an elongate nozzle having a downstream nozzle opening that is spaced from the cap outer surface.*

*19. A jet pump as in claim 18, wherein the cap is unitary.*

*20. A jet pump as in claim 15, wherein the housing front part additionally comprises a post aligned with the axis, and wherein the rotor comprises a central bore configured to accommodate the post.*

*21. A jet pump as in claim 15, wherein a reference plane is defined by the flat portion of the surface of the housing front part in the pump chamber and is normal to the axis, and wherein moving radially from the first point to the second point a distance between the cap inner surface and the reference plane progressively decreases without increasing.*

*22. A jet pump as in claim 21, wherein a radially flat portion of the cap inner surface is defined between the first point and the second point, and wherein the distance between the cap inner surface and the reference plane does not decrease moving radially across the radially flat portion.*

*23. A jet pump as in claim 15, wherein a reference plane is defined by the flat portion of the surface of the housing front part in the pump chamber and is normal to the axis, and wherein a radially flat portion of the cap inner surface is defined between the first point and the second point, and wherein the distance between the cap inner surface and the reference plane does not decrease moving radially across the radially flat portion.*

*24. A jet pump as in claim 4, wherein at the inlet the outer surface of the cap extends outwardly relative to a portion of the outer surface of the cap radially adjacent the inlet.*

*25. A jet pump as in claim 24, wherein the inner surface of the cap in at least part of the inlet is inclined relative to a line normal to the axis.*

*26. A jet pump as in claim 25, wherein a plurality of the holes formed through the cap in the inlet portion extend through the part of the inlet portion wherein the inner surface of the cap is inclined relative to the line normal to the axis.*

*27. A jet pump as in claim 4, wherein the flat portion of the housing front part is radially spaced from the axis.*

*28. A jet pump as in claim 27, wherein the outer portion of the housing front part is parallel to the axis.*

*29. A jet pump as in claim 8 additionally comprising an inclined portion of the cap inner surface arranged between the inlet and the second point, the inclined portion being inclined relative to the axis, wherein the distance between the cap inner surface and the reference plane decreases moving radially across the inclined portion.*

*30. A jet pump as in claim 29, wherein the motor comprises an induction motor.*

*31. A jet pump as in claim 30, wherein the stator comprises an electrically activated stator, and the rotor comprises a permanent magnet rotor, and wherein the rotor is magnetically drawn to the stator.*

*32. A jet pump as in claim 31, wherein the motor has no propeller shaft.*

*33. A jet pump as in claim 32, wherein the stator has a well formed therein, the opening of the well being oriented toward the cap, and the rotor is shaped to fit within the well.*

*34. A jet pump as in claim 32, wherein the stator comprises a post and the rotor comprises a central bore configured to accept the post therein so as to maintain proper seating of the rotor.*

*35. A jet pump as in claim 34, wherein the rotor is sufficiently magnetically attracted to the stator so that the rotor will seat itself on the stator post when placed near the stator.*

*36. A jet pump as in claim 8, wherein a radially flat portion of the cap inner surface is defined between the first point and the second point.*

*37. A jet pump as in claim 36, wherein the distance between the cap inner surface and the reference plane does not decrease moving radially across the radially flat portion.*

*38. A jet pump as in claim 37, wherein a first elongate radially extending portion of the cap inner surface in the inlet is inclined relative to the axis, a second elongate radially extending portion of the cap inner surface comprising the radially flat portion, and a third elongate radially extending portion of the cap inner surface is inclined relative to the axis, the second portion being between the first and third portions.*

*39. A jet pump as in claim 38, wherein the second portion is contiguous with the first portion, and the second portion is contiguous with the third portion.*

*40. A jet pump as in claim 39, wherein the cap is unitary.*

*41. A jet pump as in claim 40, wherein the outlet is radially spaced from the second portion.*

*42. A jet pump as in claim 36 additionally comprising an inclined portion of the cap inner surface arranged between the inlet and the second point, the inclined portion being inclined relative to the axis, wherein the distance between the cap inner surface and the reference plane decreases moving radially across the inclined portion.*

*43. A jet pump as in claim 36, wherein a first elongate radially extending portion of the cap inner surface in the inlet is inclined relative to the axis, a second elongate radially extending portion of the cap inner surface comprising the radially flat portion, and a third elongate radially extending portion of the cap inner surface is inclined relative to the axis, the second portion being between the first and third portions.*

*44. A jet pump as in claim 43, wherein the outlet is radially spaced from the second portion.*

*45. A jet pump as in claim 44, further comprising a second outlet opening spaced radially from the second portion and from the outlet opening.*

*46. A jet pump as in claim 45, wherein at the inlet the outer surface of the cap extends outwardly relative to a portion of the outer surface of the cap radially adjacent the inlet.*

*47. A jet pump as in claim 46, wherein the inner surface of the cap in at least part of the inlet is inclined relative to a line normal to the axis.*

*48. A jet pump as in claim 47, wherein a plurality of the holes formed through the cap in the inlet portion extend through the part of the inlet portion wherein the inner surface of the cap is inclined relative to the line normal to the axis.*

*49. A jet pump as in claim 48, wherein the rotor is magnetically drawn to the stator, and wherein the stator comprises a post and the rotor comprises a central bore configured to accept the post therein so as to maintain proper seating of the rotor.*

*50. A jet pump as in claim 49, wherein the motor has no propeller shaft.*

*51. A jet pump as in claim 50, wherein the flat portion of the housing front part is radially spaced from the axis.*

*52. A jet pump as in claim 51, wherein the outer portion of the housing front part is parallel to the axis.*

*53. A jet pump as in claim 52, wherein the vanes are mounted on the rotor.*

*54. A jet pump as in claim 11 additionally comprising a third outlet opening spaced radially from the inlet, wherein*

*the outlet opening, second outlet opening, and third outlet opening are spaced equidistantly from one another.*

*55. A jet pump as in claim 20, wherein the stator comprises the post, and wherein the rotor is sufficiently magnetically attracted to the stator so that when on the post the rotor will seat itself on the stator.*

*56. A jet pump as in claim 55, wherein the motor has no propeller shaft.*

*57. A jet pump as in claim 20, wherein the flat portion of the housing front part is radially spaced from the axis.*

*58. A jet pump as in claim 57, wherein the outer edge portion terminates in a front outer edge that forms an unbroken circle.*

*59. A jet pump as in claim 58, wherein at the inlet the outer surface of the cap extends outwardly relative to a portion of the outer surface of the cap radially adjacent the inlet.*

*60. A jet pump as in claim 59, wherein at least part of the inner surface of the cap in the inlet is inclined relative to the line normal to the axis.*

*61. A jet pump as in claim 60, wherein the outer edge portion of the housing front part is parallel to the axis.*

*62. A jet pump as in claim 60, wherein the outlet opening of the cap is adjacent the outer edge portion when the cap is engaged with the housing front part.*

*63. A jet pump as in claim 62, further comprising a second outlet opening spaced radially from the inlet and from the outlet opening.*

*64. A jet pump as in claim 63, wherein the outlet opening and the second outlet opening each open into a respective elongate nozzle having a downstream nozzle opening that is spaced from the cap outer surface.*

*65. A jet pump as in claim 64, wherein the cap is unitary.*

*66. A jet pump as in claim 65 additionally comprising an inclined portion of the cap inner surface arranged between the inlet and the second point, the inclined portion being inclined relative to the axis, wherein the distance between the cap inner surface and the reference plane decreases moving radially across the inclined portion.*

*67. A jet pump as in claim 66, wherein a reference plane is defined by the flat portion of the surface of the housing front part in the pump chamber and is normal to the axis, and wherein a radially flat portion of the cap inner surface is defined between the first point and the second point, and the radially flat portion is parallel to the reference plane.*

*68. A jet pump as in claim 67, wherein moving radially from the first point to the second point a distance between the cap inner surface and the reference plane progressively decreases without increasing.*

*69. A jet pump as in claim 65, wherein a reference plane is defined by the flat portion of the surface of the housing front part in the pump chamber and is normal to the axis, and wherein a distance between the second point and the reference plane is less than a distance between the first point and the reference plane.*

*70. A jet pump as in claim 69, wherein a radially flat portion of the cap inner surface is defined between the first point and the second point.*

*71. A jet pump as in claim 70 additionally comprising an inclined portion of the cap inner surface arranged between the inlet and the second point, the inclined portion being inclined relative to the axis, wherein the distance between the cap inner surface and the reference plane decreases moving radially across the inclined portion.*

*72. A jet pump as in claim 71, wherein the distance between the cap inner surface and the reference plane does not decrease moving radially across the radially flat portion.*

*73. A jet pump as in claim 70, wherein a first elongate radially extending portion of the cap inner surface in the inlet is inclined relative to the axis, a second elongate radially extending portion of the cap inner surface comprises the radially flat portion, and a third elongate radially extending portion of the cap inner surface is inclined relative to the axis, the second portion being between the first and third portions.*

*74. A jet pump as in claim 73, wherein the outlet and the second outlet are each radially spaced from the second portion.*

* * * * *